March 17, 1936.  W. H. PEARCE  2,034,352

IMPREGNATED SLEEVING

Filed Feb. 8, 1934

Inventor
William H. Pearce

By Murray & Gugelter
Attorneys

Patented Mar. 17, 1936

2,034,352

UNITED STATES PATENT OFFICE 2,034,352

IMPREGNATED SLEEVING

William H. Pearce, Cincinnati, Ohio

Application February 8, 1934, Serial No. 710,341

3 Claims. (Cl. 91—68)

The present invention relates to an improved impregnated sleeving product and a novel method of making the same. The invention further relates to products known as varnished or saturated sleeving and varnished tubing which are prepared from the impregnated sleeving of the invention and has for an object the provision of varnished sleeving and tubing that are exceptionally flexible and which are furthermore very elastic under bending, twisting and compressive strain and which possess a heretofore unattained elasticity under stretching and longitudinal compressive strains.

A further object of the invention is to provide a simple and efficient method of preparing hollow braided fabric tubing for impregnation with a stiffening agent whereby the foregoing mentioned advantages may be attained in the products prepared from the impregnated tubing.

A further object of the invention is to provide a method of mounting untreated tubular braided fabric on a mandrel or rod to insure rapid and easy removal of the tubing after impregnation without damage thereto.

Another object is to provide a fabric tubing that is impregnated while under longitudinal compressive strain and which, upon coating by known methods with ordinary insulating varnishes provides a substantially crackproof varnished tubing.

These and other objects are attained by the means and method herein described and disclosed in the accompanying drawing, in which.

Figure 1:
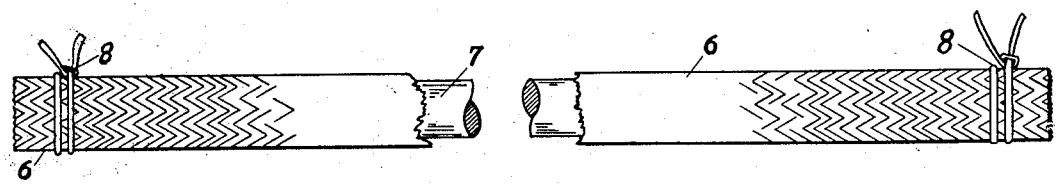
Fig. 1 is a view, part broken away, of a piece of untreated tubing in position upon a mandrel rod preparatory to impregnation.

Heretofore the product known generally as impregnated sleeving from which were made the so called varnished sleeving and varnished tubing for various uses, especially as manually applied tubular or cylindrical insulation for electrical conductors, has been the subject of many manufacturing difficulties, the attempted solutions of which difficulties have oftentimes resulted in finished products which cracked when bent or twisted, thereby rupturing the applied insulating body. Among other efforts to overcome these difficulties and improve the flexibility and resilience of the product, considerable attention has been directed to the product of special varnishes of great flexibility and elasticity. Practically none of the ultimate products have been all that could be desired prior to the present invention. The present invention then, at once provides a better and more workable article of manufacture and vastly simplifies the production thereof by insuring easy removal of the tubing from the mandrel after impregnation which is the initial step in the manufacture of this class of articles.

For the manufacture of the impregnated tubing a tubular braided sleeve of any suitable type, such as braided tubing 6, is used and this is cut into lengths considerably in excess of the length of finished product to be made. The tubular braid may be of any suitable yarn size on any style of braider. If desired the braid may be colored and shrunk after an optional initial cleaning and air drying to lay the fibers of the yarn strands. By way of example and not of limitation, a manufacturer employing thirty-six inch (36") mandrels for maufacturing thirty-six inch (36") lengths of impregnated sleeving would cut the braided tubular sleeving into lengths of approximately fifty inches (50") and each of these lengths of tubular sleeving would have inserted in them one of the mandrel rods. The rods serve to hold the tubes open so that the inner walls of the sleeving can not collapse. The entire length of sleeving is first compressed longitudinally into a space of thirty-six inches (36") and, allowing a small amount of the sleeving to extend beyond the ends of the mandrel, the sleeving is fixed to the mandrel closely adjacent the ends thereof by any suitable means such as tying, glueing, or clamping. The excess length of sleeving disposed between the fixed portions is now distributed evenly over the length of the mandrel by merely rubbing it lightly over or between any kind of surfaces, for example, by drawing the mandrel and sleeving through the fingers. This leaves a slack in the braid which makes the braid tend to stand away from the mandrel rod. The threads of the braid thus secured on the mandrel are not impregnated with any desired sizing medium which may be a starch solution, suitable shellac or varnish solution or a glue solution. The application may be by spray, brush or dipping or otherwise flowing the sizing material on in sufficient quantity to impregnate the untreated fibers and strands of the sleeving. The impregnated sleeving is rubbed longitudinally to ensure penetration of the sizing and to evenly distribute the slack and then allow to dry on the mandrel either in the atmosphere or with heat or with a flow of air, after which the clamping means are removed. Because of the longitudinally compressed condition of the braided strands, the impregnating material has had opportunity to adhere less completely to the mandrel so that by merely rubbing or squeezing the impregnated sleeving between the fingers, the discontinuous adhesions are readily broken and the impregnated sleeving yields to easy removal from the mandrel. It is then dipped or otherwise treated with varnish solution and dried thoroughly. By slightly stretching the length of impregnated sleeving the finished product is obtained and is usable as a foundation for subsequent dippings or applications of ordinary insulating varnish, the number of coatings being dependent upon the character of work for which it is intended to be used. Medium to good grades of ordinary insulating varnishes have been found to produce a superior varnished sleeving and/or tubing and they may be used advantageously as the initial impregnating medium if desired.

Figure 2:
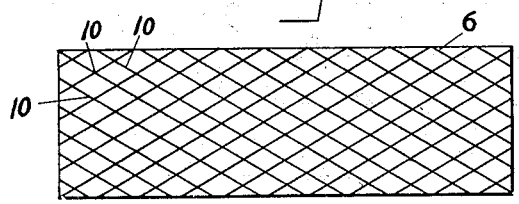
Fig. 2 is a somewhat diagrammatic and enlarged longitudinal section of the tubular braided fabric used.
Figure 3:
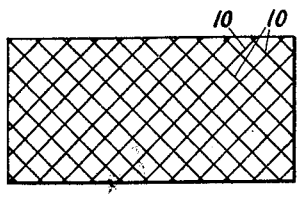
Fig. 3 is a similar diagrammatic and enlarged longitudinal section of the tubing as compressed on the mandrel for impregnation.
Figure 4:
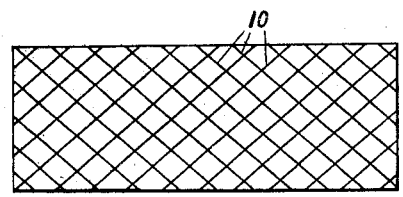
Fig. 4 is a similar diagrammatic and enlarged section showing the position of the strands in the finished sleeving and varnished tubing prepared from the impregnated tubing of the invention.

For a better understanding of the invention, reference is made at this time to Figs. 2, 3 and 4 of the drawing. These figures are enlarged diagrammatic showings of the relation of yarn strands in the braided tubular stock, in the same length of stock as compressed on the mandrel and held by the impregnating and dipping solution and in the impregnated sleeving as slightly stretched to less than original length for receiving the additional varnish coatings. Attention is called to the fact that the longitudinally compacted tubing has the threads thereof crossed more times per inch than in the original braiding and that this condition is retained by the saturating varnish causing the finished sleeving and tubing to have considerable springiness and elasticity.

The varnished sleeving thus made is not at all brittle, and may be collapsed, folded double and compressed without materially injuring the insulating qualities thereof. The varnished sleeving or tubing can be subjected to such abuses as combined twisting and stretching and will resume its original hollow tubular shape of its own accord.

Referring now to the drawing, the braided fabric 6 is shown in Fig. 1 enveloping mandrel rod 7 and is securely clamped thereto near the ends of the rod by having cords 8 bound tightly around it.

Fig. 2 shows in further exaggerated proportion a simplified enlargement of a longitudinal section of the fabric 6 where the strands 10 of the weave are somewhat widely separated and have relatively few crossings to the inch.

Fig. 3 shows in a similar manner the same amount of sleeving as compacted on the mandrel and during the initial varnish applications. The sleeving is taken from the mandrel in this condition and further coated and dried. Thereafter the sleeving is pulled out or stretched to somewhat less than original length and thereafter any further desired applications of varnish may be added to secure the necessary wall thickness.

Fig. 4 shows the relative condition of the yarn strands in the finished sleeving and tubing and indicates clearly that the strands are held closer than in the initial braided material.

Referring to Fig. 1 it will be appreciated that the compacted tubing will tend to stand out from the mandrel and that adhesions of sizing material will be particularly at the relatively small points of contact with the mandrel. These are easily broken loose by rubbing over the tubing when the impregnated material is dry. If the tubular braid on the mandrel is not thus compressed, the adhesion of the sizing material, particularly in the case of varnishes, shellacs, etc., is so continuous and so excessive that it becomes necessary to injure varnish and fabric before it can be released from the mandrel. In many of such cases it is impossible to remove a usable section of impregnated sleeving from the mandrel.

Figure 5:
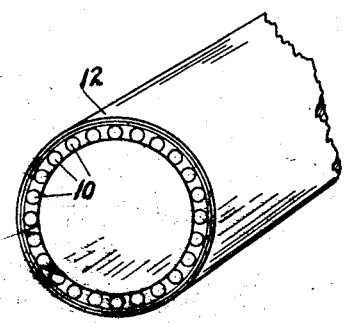
Fig. 5 is a cross sectional view of the varnished tubing.

As shown in Fig. 5 the complete impregnated sleeving shown at 11 is provided with one or a plurality of varnish coatings 12 thereby providing the improved varnished tubing or sleeving of the invention.

The impregnated sleeving of the invention is in itself an improved article of commerce to be sold as such to users who may choose to apply insulating varnishes of their own specification thereto. It will be noted that it is not necessary to use the mandrels after the initial impregnation has been effected.

The amount of slack sleeving to be distributed over the mandrel may be varied, especially as the yarn strand size and quality in the sleeving is varied. Heavier yarn strand 31 normally indicates a smaller excess length of sleeving.

What is claimed is:

1. The method of making impregnated sleeving comprising the steps of cutting tubular braided fabric into lengths in excess of the length of mandrel rod, then inserting the rod into the tubing, longitudinally compacting substantially the entire length of tubing onto the rod, securing the tubing to the rod adjacent each end, then distributing the compacted excess length of tubing evenly over the mandrel rod between the secured portions, applying impregnating material to the fabric in the compacted condition and allowing same to dry, then removing the securing means, then breaking down the adhesion of impregnated material on the mandrel rod, then removing the tubing from the rod.

2. The method of making impregnated sleeving comprising the steps of enveloping a cylindrical mandrel rod with a length of tubular braided fabric greater than the length of the rod thereby longitudinally compacting the braided fabric, then securing the fabric to the rod adjacent the ends thereof, impregnating the fabric while under compressive strain, and drying it, then releasing the securing means, and removing the impregnated sleeving from the rod.

3. The method of making impregnated sleeving which comprises the steps of compacting a length of tubular fabric onto a mandrel rod of lesser length, securing the fabric near the ends of the mandrel to retain it in compressed condition, then subjecting the fabric to an impregnating medium, and drying it, submitting the impregnated fabric on the mandrel to frictional pressure to release adhering impregnating material from the mandrel, then releasing the securing means.

WILLIAM H. PEARCE.